(12) United States Patent
Liu et al.

(10) Patent No.: US 11,689,098 B2
(45) Date of Patent: Jun. 27, 2023

(54) ARCHITECTURE FOR AC/DC SMPS WITH PFC AND MULTIMODE LLC DC/DC CONVERTER

(71) Applicant: GaN Systems Inc., Ottawa (CA)

(72) Inventors: Xuechao Liu, Kanata (CA); Di Chen, Ottawa (CA); Yajie Qiu, Kanata (CA)

(73) Assignee: GAN SYSTEMS INC., Ottawa (CA)

( * ) Notice: Subject to any disclaimer, the term of this patent is extended or adjusted under 35 U.S.C. 154(b) by 0 days.

(21) Appl. No.: 17/497,233

(22) Filed: Oct. 8, 2021

(65) Prior Publication Data

US 2023/0111992 A1  Apr. 13, 2023

(51) Int. Cl.
| | | |
|---|---|---|
| *H02M 1/42* | (2007.01) | |
| *H02M 3/335* | (2006.01) | |
| *H02M 7/48* | (2007.01) | |
| *H02M 7/04* | (2006.01) | |
| *H02M 7/02* | (2006.01) | |
| *H02M 3/00* | (2006.01) | |

(52) U.S. Cl.
CPC ....... *H02M 1/4233* (2013.01); *H02M 1/4241* (2013.01); *H02M 3/33569* (2013.01); *H02M 7/4815* (2021.05); *H02M 3/01* (2021.05); *H02M 7/02* (2013.01); *H02M 7/04* (2013.01)

(58) Field of Classification Search
CPC ...... H02M 3/01; H02M 3/335; H02M 3/3369; H02M 1/42; H02M 1/4233; H02M 1/4241
See application file for complete search history.

(56) References Cited

U.S. PATENT DOCUMENTS

| | | | |
|---|---|---|---|
| 9,590,494 B1 | 3/2017 | Zhou et al. | |
| 2019/0312525 A1* | 10/2019 | Nakao | H02M 1/4241 |
| 2021/0367453 A1* | 11/2021 | Galigekere | H02M 3/01 |

OTHER PUBLICATIONS

Xuechao (Jimmy) Liu, Webinar presentation entitled "Benefits and Advantages of a GaN-based 3kW AC/DC PSU", Aug. 2021 (https://gansystems.com/gan-webinar-playback-benefits-gan-based-3kw-acdc-psu/).
Xuechao (Jimmy) Liu, article entitled "Boosting efficiency in fast-charge adapters", Power Electronics Tips, Oct. 5, 2020 (https://www.powerelectronictips.com/boosting-efficiency-in-fast-charge-adapters-faq/).
On Semiconductor Application note AND9618/D "LLC Resonant converter Synchronous Rectification Design"; Jan. 2018 Rev.2 (www.onsemi.com).

(Continued)

*Primary Examiner* — Gary L Laxton
(74) *Attorney, Agent, or Firm* — Workman Nydegger (57) ABSTRACT

An AC/DC Switching Mode Power Supply (SMPS) comprises a PFC stage, an isolated LLC DC/DC converter stage, and a control circuit that provides feedback/control signals to PFC and LLC controllers, to enable a plurality of operating modes, dependent on a sensed peak AC input voltage and required output voltage Vo. The PFC provides a first DC bus voltage Vdc (e.g. 200V) for low line AC input and a second DC bus voltage (e.g. 400V) for high line or universal AC input. A multi-mode LLC converter is operable in a half-bridge mode or a full-bridge mode. For low line AC input, output voltage Vo, and PFC output Vdc, the LLC operates in full-bridge mode; for high line input, output voltage Vo and PFC output 2×Vdc, the LLC operates in half-bridge mode; for universal AC input, output voltage 2×Vo, and PFC output 2×Vdc, the LLC operates in full-bridge mode.

15 Claims, 11 Drawing Sheets

(56) References Cited

OTHER PUBLICATIONS

Lou Frenzel, "LLC Resonant Converters Raise the Power-Efficiency Bar", Electronic Design, Nov. 7, 2017 (https://www.electronicdesign.com/power-management/article/21805811/llc-resonant-converters-raise-the-powerefficiency-bar).

J. Wang and B. Lu, "Open loop synchronous rectifier driver for LLC resonant converter," 2013 Twenty-Eighth Annual IEEE Applied Power Electronics Conference and Exposition (APEC), 2013, pp. 2048-2051, doi: 10.1109/APEC.2013.6520577.

Universal Serial Bus Power Delivery Specification, Revision 3.1 Version 1.0, Release date: May 2021 (usb.org/documents).

* cited by examiner

| 80 Plus test type[a] | Icon | 115 V internal non-redundant | | | | 230 V internal redundant | | | | 230 V EU internal non-redundant | | | |
|---|---|---|---|---|---|---|---|---|---|---|---|---|---|
| Percentage of rated load | | 10% | 20% | 50% | 100% | 10% | 20% | 50% | 100% | 10% | 20% | 50% | 100% |
| 80 Plus | 80 PLUS | | 80% | 80% | 80% | | | | | | 82% | 85% | 82% |
| 80 Plus Bronze | 80 PLUS BRONZE | | 82% | 85% | 82% | | 81% | 85% | 81% | | 85% | 88% | 85% |
| 80 Plus Silver | 80 PLUS SILVER | | 85% | 88% | 85% | | 85% | 89% | 85% | | 87% | 90% | 87% |
| 80 Plus Gold | 80 PLUS GOLD | | 87% | 90% | 87% | | 88% | 92% | 88% | | 90% | 92% | 89% |
| 80 Plus Platinum | 80 PLUS PLATINUM | | 90% | 92% | 89% | | 90% | 94% | 91% | | 92% | 94% | 90% |
| 80 Plus Titanium | 80 PLUS TITANIUM | 90% | 92% | 94% | 90% | 90% | 94% | 96% | 91% | 90% | 94% | 96% | 94% |

Universal AC input AC/DC SMPS with PFC and LLC DC/DC Converter

Operational Mode 1:
Vdc=200V
Output Voltage=Vo
Low line AC Input

Fig. 6A

Operational Mode 2:
Vdc=400V
Output Voltage=Vo
High line AC Input

Fig. 6B

Operational Mode 3:
Vdc=400
Output Voltage=2xVo
Universal AC Input

Fig. 6C

|  | Output Voltage | AC Input | PFC Output, Vdc | Multi-mode LLC |
|---|---|---|---|---|
| Operational mode 1 | Vo | Low line AC | Vdc (e.g. 200V) | Full-Bridge |
| Operational mode 2 | Vo | High line AC | 2xVdc (e.g. 400V) | Half-Bridge |
| Operational mode 3 | 2xVo | Universal AC | 2xVdc (e.g. 400V) | Full-Bridge |

Fig. 7

\* is a first (Voltage feedback) control signal to PFC controller to select dc bus voltage $Vdc_1$ or $2xVdc_1$ \*\* is a second (FB/HB mode) control signal to LLC controller to select full-bridge mode or half-bridge mode operation Example Embodiment: 1kW Datacenter PSU with fixed output voltage Vo

| | | BTP PFC+Half Bridge LLC ① @PFC fs=100KHz; @LLC fs=250KHz | BTP PFC+Multi-mode LLC ② @PFC fs=100KHz; @LLC fs=250KHz | BTP PFC+Multi-mode LLC ③ @PFC fs=200KHz; @LLC fs=250KHz |
|---|---|---|---|---|
| Input: 90Vac | | | | |
| Output voltage: 54V | | | | |
| Output power: 1000W | | | | |
| Si MOSFET: 31mΩ 650V | | | | |
| PFC GaN: GS-065-060-5-T-A (25mΩ 650V) | | | | |
| LLC GaN: GS66508B (50mΩ 650V) | | | | |
| Unit: Watt | | | | |
| PFC stage | GaN Transistor Switching loss | 10.2 | 4.01 | 8.18 |
| | GaN Transistor Conduction loss | 5.65 | 5.07 | 6.15 |
| | Si MOSFET Conduction loss | 7.5 | 7.5 | 7.5 |
| | PFC inductor | 6 | 4 | 3 |
| LLC stage | GaN Transistor Switching loss | 0.88 | 0.1 | 0.1 |
| | GaN Transistor Conduction loss | 2.87 | 2.87 | 2.87 |
| | GaN Transistor Deadtime loss | 0.6 | 0.6 | 0.6 |
| | Si MOSFET Switching loss | 0 | 0.8 | 0.8 |
| | Si MOSFET Conduction loss | 0 | 2 | 2 |
| | Si MOSFET Deadtime loss | 2 | 0.4 | 0.4 |
| | Resonant inductor | 2 | 2 | 2 |
| | Transformer | 10 | 10 | 10 |
| | SR MOSFET loss | 6 | 6 | 6 |
| | Total loss (W) | 51.7 | 45.35 | 49.6 |
| | Efficiency | 95.1% | 95.7% | 95.3% |

- 14% loss reduction and 0.6% overall efficiency improvement
- x2 switching frequency for PFC with 50% size reduction for PFC inductor Example 1kW SMPS with PFC + LLC : 1KW Full Load at low line AC input

Fig. 10

| | ① BTP PFC+Half Bridge LLC @PFC fs=100kHz, @LLC fs=250KHz | ② BTP PFC+Multi-mode LLC @PFC fs=100kHz, @LLC fs=250KHz | ③ BTP PFC+Multi-mode LLC @PFC fs=200kHz, @LLC fs=250KHz |
|---|---|---|---|
| • Input: 90Vac<br>• Output voltage: 54V<br>• Output power: 100W<br>• Si MOSFET: 31mΩ 650V<br>• PFC GaN: GS-065-060-5-T-A (25mΩ 650V)<br>• LLC GaN: GS66508B (50mΩ 650V)<br>• Unit: Watt | | | |
| PFC stage — GaN Transistor | 3.9 | 0.94 | 1.83 |
| GaN Transistor | 1.87 | 0.58 | 0.58 |
| LLC stage — Si MOSFET | 0 | 2 | 2 |
| Total transistor's loss (W) | 5.77 | 3.52 | 4.41 |
| Efficiency improvement | | 2.25% | 1.36% |

- *1.3%~2.3% efficiency improvement at light load (10%)*

Fig. 11

Example 1kW SMPS with PFC + LLC : 1KW Light load at low line AC input

| $V_{ACin}$=90Vac | ① | ② | ③ |
|---|---|---|---|
| | Vdc=400V | Vdc=200V | Vdc=200V |
| | Fs=100KHz L=0.4mH | Fs=100KHz L=0.2mH | Fs=200KHz L=0.1mH |
| Change in losses | | -8W | -1.8W |
| Change in efficiency | | +0.80% | +0.20% |
| Change in temperature | | -16°C | -5°C |
| PFC inductor size (volume) | | -30% | -50% |

Example: 1kW Full Load Bridgeless Totem Pole PFC performance comparison at low line AC 90Vac input

Fig. 12

Example: SMPS for USB PD3.1 adapter using conventional topology

Fig. 13 (Prior Art)

Example Embodiment: SMPS with
PFC and multi-mode LLC for USB PD3.1 adapter

Fig. 14

Operational mode 1
Vdc=200V
Output voltage =Vo
Low line AC input

Fig. 15A

Operational mode 2
Vdc=400V
Output voltage =Vo
High line AC input

Fig. 15B

Operational mode 3
Vdc=400V
Output voltage =2xVo
Universal AC input

Fig. 15C

|  | PD3.1 Output Voltage | DC output voltage | AC Input | PFC Output Vdc | Multi-mode LLC |
|---|---|---|---|---|---|
| Mode 1 SPR | 5V, 9V, 15V, 20V | 25V | Low line AC | Vdc₁ (e.g. 200V) | Full-Bridge |
| Mode 2 SPR | 5V, 9V, 15V, 20V | 25V | High line AC | 2x Vdc₁ (e.g. 400V) | Half-Bridge |
| Mode 3 EPR & AVS | 28V, 36V, 48V | 50V | Universal AC | 2x Vdc₁ (e.g. 400V) | Full-Bridge |

Per USB Power Delivery
Specification Revision
3.1, Version 1.0 (PD3.1),
May 2021 :   SPR = Standard Power Range EPR = Extended Power Range AVS = Adjustable Voltage Supply

Fig. 16

ARCHITECTURE FOR AC/DC SMPS WITH PFC AND MULTIMODE LLC DC/DC CONVERTER

CROSS-REFERENCE TO RELATED APPLICATION(S)

This application is related to U.S. patent application No. 63/161,558, filed Mar. 16, 2021, entitled "Architecture for Multi-Port AC/DC Switching Mode Power Supply", which is incorporated herein by reference in its entirety.

This application is related to U.S. patent application No. 63/253,592 filed Oct. 8, 2021, entitled "Architecture for PFC Optimization of AC input AC/DC Switching Mode Power Supply", which is incorporated herein by reference in its entirety.

TECHNICAL FIELD

This invention relates to switching mode power supplies (SMPS), and more particularly to AC input AC/DC SMPS comprising Power Factor Correction (PFC) and an LLC DC/DC converter.

BACKGROUND

80 PLUS™ is a voluntary certification program launched in 2004, intended to promote efficient energy use in SMPS, such as computer power supply units (PSUs). Certification may be obtained for products that have more than 80% energy efficiency at 10%, 20%, 50% and 100% of rated load, and a power factor of 0.9 or greater at 100% load. For a given power supply, efficiency depends on AC line input and load. Losses are typically higher at low line AC input. SMPS are typically most efficient at between half and three-quarters load, much less efficient at low load, and somewhat less efficient at maximum load.

Figure 1:
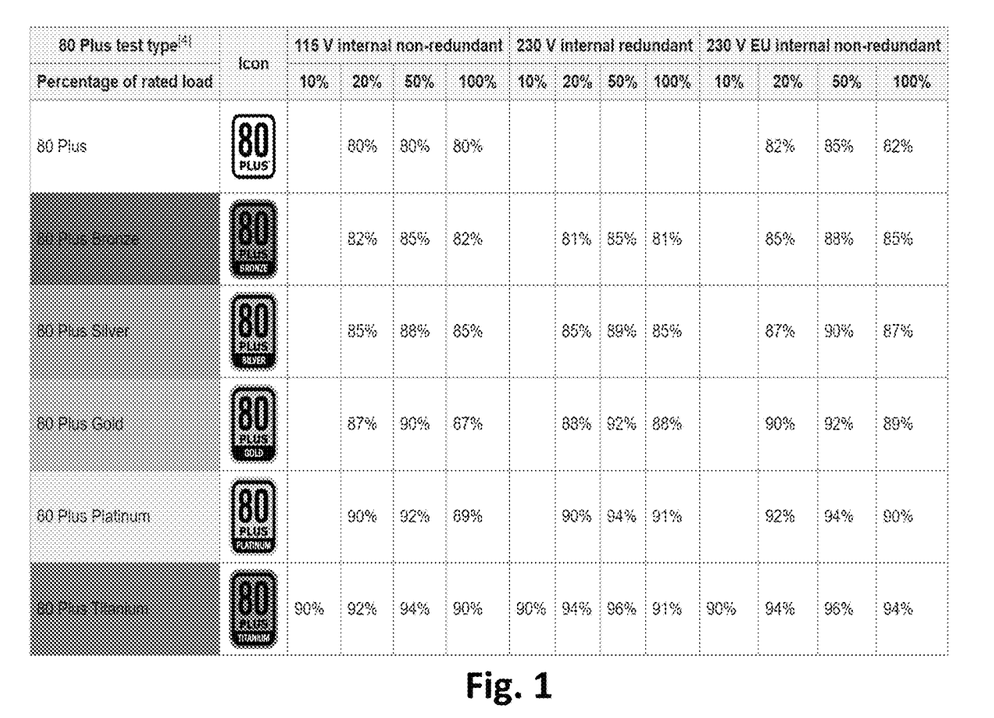
FIG. 1 shows a table listing requirements for 80 Plus test categories.

Referring to FIG. 1, to qualify for 80 Plus, a power supply must achieve at least 80% efficiency at four specified loads: 10%, 20%, 50% and 100% of maximum rated power. To meet 80Plus Titanium requirements, an efficiency of at least 90% at low load (10%) is specified for both low line AC input, e.g. 115 Vac, and high line AC input, e.g. 230 Vac.

Figure 2:
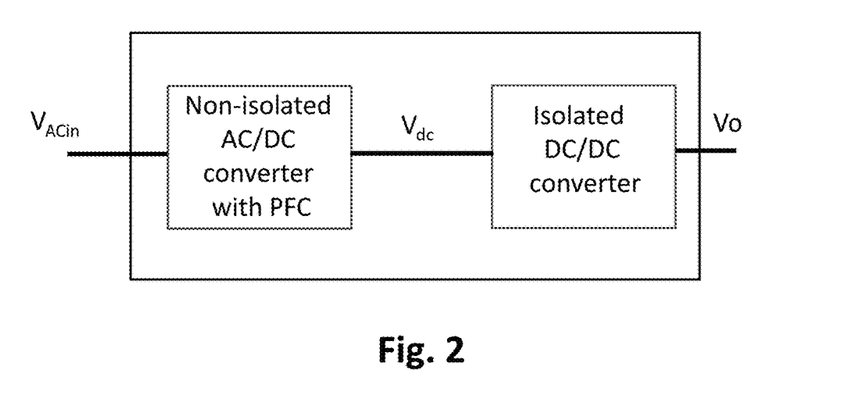
FIG. 2 shows a simplified functional block diagram for an AC input AC/DC Switching Mode Power Supply comprising a non-isolated AC/DC converter with PFC and an isolated DC/DC converter.

As illustrated schematically in FIG. 2, a PSU may comprise an AC input AC/DC SMPS, for example: a first stage comprising an AC input PFC stage which receives input AC voltage $V_{ACin}$ and provides an output bus voltage Vdc, and a second stage comprising an electrically isolated DC/DC converter to provide a required output DC voltage Vo to one or more output ports. The above referenced U.S. patent application Ser. No. 63/253,592 entitled "Architecture for PFC Optimization of AC input AC/DC Switching Mode Power Supplies" discloses an AC input AC/DC SMPS with PFC wherein the isolated DC/DC converter is a single end flyback converter. In other types of AC/DC SMPS, the second stage comprises an LLC DC/DC converter, such as a half-bridge or full-bridge LLC topology.

Figure 3:
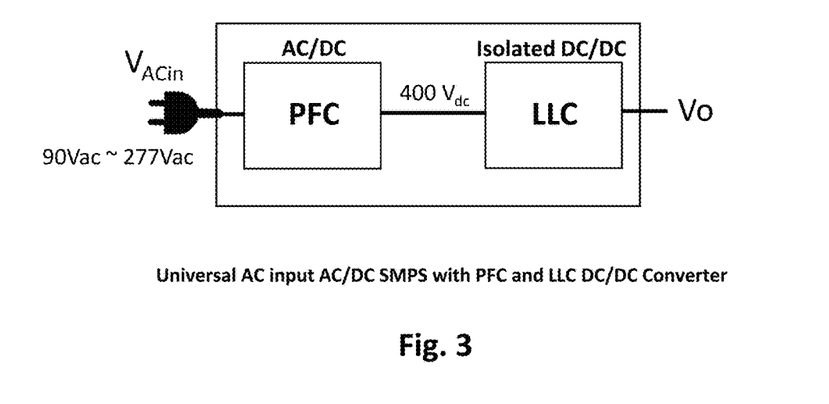
FIG. 3 shows a simplified functional block diagram for an AC input AC/DC Switching Mode Power Supply, comprising a non-isolated AC/DC converter with PFC and an isolated DC/DC converter comprising an LLC DC/DC converter.

In a universal AC input AC/DC SMPS comprising PFC and an LLC DC/DC converter such as illustrated schematically in FIG. 3, the PFC stage provides a fixed DC bus voltage Vdc, typically ~400 Vdc, and the losses and temperature of the PFC stage are large, especially at low line AC input. Using an LLC DC/DC converter with a variable switching frequency, it is difficult to support a wide range of input and output voltages. Thus, there are challenges in meeting 80Plus Titanium requirements, especially at low line AC input.

For example, one known example of a datacenter PSU, which is specified for 80Plus Titanium, comprises a universal AC input SMPS Model PAC3000S12-T1. This PSU delivers an output power of 3000 W for high line AC input in the range of 230 Vac to 240 Vac, but at low line AC input, in the range 100 Vac to 127 Vac, the output is only 1300 W. There is significant output power derating due to low efficiency and high temperature at low line AC input.

Thus, there is a need for improved or alternative AC input AC/DC SMPS, for applications such as datacenter PSU and PD (Power Delivery) USB adapters, to overcome or mitigate the above-mentioned issues, e.g. to provide improved efficiency for operation over a range of AC line input voltages and loads.

SUMMARY OF INVENTION

The present invention seeks to provide an improved or alternative architecture for an AC input AC/DC SMPS comprising PFC and an LLC DC/DC converter, for performance improvement, e.g. improved efficiency and/or power density, or a defined output voltage for some specific requirement.

Disclosed herein is an architecture for an AC input AC/DC Switching Mode Power Supply (SMPS) with a Power Factor Correction (PFC) stage, a multi-mode LLC resonant DC/DC converter stage and a control circuit for operation of the SMPS in a plurality of modes, dependent on AC input voltage range and load. In some embodiments the DC/DC converter is a hybrid GaN/Si LLC converter. In example embodiments the PFC stage can be any appropriate active power factor correction (PFC) topology, such as bridge rectification Boost PFC or a Bridgeless Totem Pole PFC.

One aspect provides an AC input AC/DC Switching Mode Power Supply (SMPS) comprising:

a first stage comprising a non-isolated AC/DC converter comprising a power factor correction (PFC) stage which receives an AC input voltage ($V_{ACin}$) and provides a DC bus voltage Vdc; and a PFC controller;

a second stage comprising an isolated DC/DC converter, the DC/DC converter comprising an LLC resonant DC/DC converter which receives Vdc and provides an output voltage Vo; and an LLC controller;

the LLC resonant DC/DC converter comprising first and second half-bridge legs, which are operable in a half-bridge mode and in a full-bridge mode;

and a control circuit configured to:

sense the AC input voltage ($V_{ACin}$), provide a first (voltage feedback) control signal to the PFC controller to regulate the output of the PFC to provide a dc bus voltage Vdc, dependent on the AC input voltage;

provide a second (full-bridge/half bridge mode) control signal to the LLC controller to operate the LLC resonant converter in the full-bridge mode or the half-bridge mode, dependent on the AC input voltage and/or defined load requirement;

in a first operating mode, for a low line AC input at or below a threshold value, the PFC regulates Vdc to a first value $Vdc_1$ and LLC resonant converter operates in full-bridge mode to provide a first output voltage Vo;

and in a second operating mode, for a high line AC input above the threshold value, the PFC regulates Vdc to a second value, which is twice the first value ($2 \times Vdc_1$), and the LLC resonant DC/DC converter operates in the half-bridge mode to provide the first output voltage Vo.

In some embodiments, in a third operating mode, for universal AC input, the PFC regulates Vdc to the second value ($2 \times Vdc_1$) and the LLC resonant DC/DC converter operates in the full-bridge mode to provide a second output voltage $2 \times Vo$. In example embodiments, in the first operational mode, for low line AC input, Vdc is regulated to a first value $Vdc_1$, e.g. 200V and in the second and third operational modes, for high line AC input and Universal AC input, Vdc is regulated to a second value $2 \times Vdc_1$, e.g. 400V.

For example, the AC/DC SMPS may be configured as a Power Supply Unit (PSU) which is operable in said first and second operating modes to provides a fixed output voltage Vo.

For example, an AC/DC SMPS may be configured as a power delivery (PD) adapter, wherein the LLC resonant converter provides a first output voltage Vo in the first and second operational modes and provides a second output voltage $2 \times Vo$ in the third operational mode.

For example, an AC/DC SMPS for a power delivery (PD) adapter comprises a plurality of output ports, each output port comprising a buck converter; and an output port controller,
wherein each buck converter receives the first output voltage Vo or the second output voltage $2 \times Vo$ from the LLC resonant converter, and provides an output voltage Vout to a corresponding output port,
wherein the output controller provides an output mode definition signal to the control circuit to control the output voltage Vout:
in the first and second operating modes, each buck converter receives the first output voltage Vo and the output voltage Vout of the output ports is selected from a first group of output voltages for a first power range;
in the third operating mode, each buck converter receives the second output voltage $2 \times Vo$ and the output voltage Vout of the output ports is selected from a second group of output voltages for a second power range, the second power range being higher than the first power range.

In an example embodiment, an AC/DC SMPS is configured as USB power delivery (PD) adapter for PD specification revision 3.1 (PD3.1), comprising a plurality of output ports, each output port comprising a buck converter and a USB port; and an output port controller, wherein each buck converter receives the first output voltage Vo or the second output voltage $2 \times Vo$ from the LLC resonant converter, and provides an output voltage Vout to the corresponding USB port,
wherein the output controller provides an output mode definition signal to the control circuit to control the output voltage Vout, so that:
in the first and second operating modes, each buck converter receives the first output voltage Vo and the output voltage Vout is selected from a Standard Power Range (SPR) consisting of output voltages of 5V, 9V, 15V and 20V.
in the third operating mode, each buck converter receives the second output voltage $2 \times Vo$ and the output voltage Vout of the output ports is selected from an Extended Power Range (EPR) or Adjustable Voltage Supply consisting of output voltages of 28V, 36V and 48V.

For example, the first output voltage Vo of the PFC is 25V and the second output voltage $2 \times Vo$ of the PFC is 50V.

For example, the non-isolated active PFC stage may be a bridge rectifier PFC or a bridgeless totem pole (BTP) PFC. The AC/DC SMPS may be implemented with any suitable semiconductor technology. For example, transistor switches of the first and second half-bridge legs of the LLC resonant converter comprise any one of: GaN transistors; SiC transistors; and Si transistors. Alternatively, in a hybrid version, for example, the first half-bridge leg comprises GaN transistors, and the second half-bridge leg comprises Si transistors, or, for example the first half-bridge leg comprises SiC transistors and the second half-bridge leg comprises Si transistors.

A second aspect of the invention provides a method of operating an AC input AC/DC Switching Mode Power Supply (SMPS) as defined above, comprising, in a control circuit, sensing the AC input voltage ($V_{ACin}$),
providing a first (voltage feedback) control signal to the PFC controller to regulate the output of the PFC to provide a dc bus voltage Vdc, dependent on the AC input voltage;
providing a second (full-bridge/half bridge mode) control signal to the LLC controller to operate the LLC resonant converter in the full-bridge mode or the half-bridge mode, dependent on the AC input voltage; and
in a first operating mode, for a low line AC input at or below a threshold value, controlling the PFC to regulates Vdc to a first value $Vdc_1$ and controlling the LLC resonant converter to operate in full-bridge mode to provide a first output voltage Vo;
and
in a second operating mode, for a high line AC input above the threshold value, controlling the PFC to regulates Vdc to a second value, which is twice the first value ($2 \times Vdc_1$), and controlling the LLC resonant DC/DC converter to operate in the half-bridge mode to provide the first output voltage Vo.

In some embodiments, the method comprises: in a third operating mode, for universal AC input, controlling the PFC to regulate Vdc to the second value ($2 \times Vdc_1$) and controlling the LLC resonant DC/DC converter to operate in the full-bridge mode to provide a second output voltage $2 \times Vo$. The method may comprises receiving, from an output port controller, an output mode definition signal to enable the control circuit to select an operational mode to provide an appropriate first output voltage Vo or second output voltage $2 \times Vo$.

Another aspect of the invention provides a control circuit for an AC input AC/DC Switching Mode Power Supply (SMPS) comprising a PFC and a multi-mode LLC resonant converter, the control circuit being configured to implement methods as disclosed herein for operating the SMPS in a plurality of operational modes, depending on sensed AC input voltage and required output voltage.

For example the control circuit has an input for receiving the AC input voltage and means for generating an input voltage sense signal indicative of any one of low line AC input, high line AC input or Universal AC input; an input for receiving an output voltage mode definition signal; means for comparing the input voltage sense signal with a reference voltage and generating a first control signal and a second control signal, dependent on the AC input voltage; the first control signal being a voltage feedback signal which is output to the PFC controller to regulate the PFC to provide an output Vdc having a first value $Vdc_1$ or second value $2 \times Vdc_1$; the second control signal being a half-bridge/full bridge mode signal which is output to the LLC controller to select half-bridge or full-bridge operation of the multi-mode LLC converter and to provide an output voltage of the LLC having a first value Vo or a second value $2 \times Vo$.

With respect to alternative terminology, switching mode power supplies (SMPS) may be referred to alternatively as switch mode power supplies or switched mode power supplies.

The AC/DC SMPS architecture comprising a PFC, Multi-mode LLC resonant converter and control circuit is applicable to AC input AC/DC SMPS for applications, such as, datacenter PSU, telecom and industrial SMPS, power delivery adapters and others.

AC/DC SMPS of example embodiments are described that offer improved performance, e.g. provide one or more of improved high load efficiency at low line AC input, improved light load efficiency at low line AC input, provides an LLC resonant converter topology that supports a wider range of output voltages, enable use of smaller inductors to increase power density.

Thus, AC input AC/DC SMPS of example embodiments comprising a PFC, Multi-mode LLC resonant converter and control circuit are disclosed, which provide performance improvement, e.g. enhanced efficiency, for a range of applications, e.g. PD adapters and PSU.

The foregoing and other features, aspects and advantages of the present invention will become more apparent from the following detailed description, taken in conjunction with the accompanying drawings, of some embodiments of the invention, which description is by way of example only.

DETAILED DESCRIPTION

Figure 4:
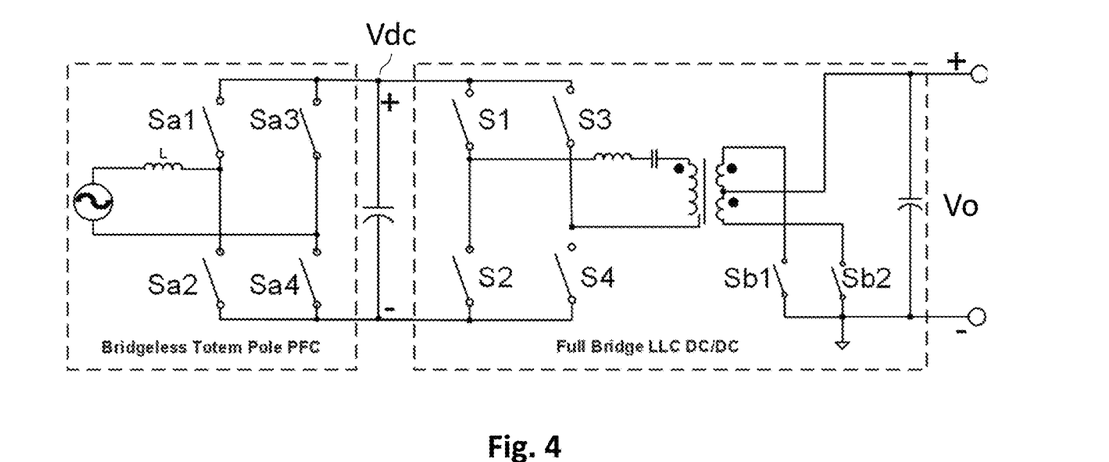
FIG. 4 shows a circuit schematic for an example AC input AC/DC Switching Mode Power Supply wherein the first stage comprises a Bridgeless Totem Pole (BTP) PFC, and the second stage comprises a full-bridge LLC DC/DC converter.

A simplified circuit block diagram for an example AC input AC/DC Switching Mode Power Supply (SMPS) comprising a PFC stage and an LLC DC/DC converter stage is shown in FIG. 3. In an example implementation illustrated in FIG. 4, the first stage comprises a Bridgeless Totem Pole (BTP) PFC, and the second stage comprises a full-bridge SR LLC DC/DC converter. The BTP PFC comprises inductor L and switches Sa1 and Sa2 and switches Sa3 and Sa4. The full bridge of the SR LLC comprises switches S1 and S2, and S3 and S4. Sb1 and Sb2 are SR MOSFETs. Conventionally, the DC bus voltage (Vdc) is fixed at ~400 Vdc. The losses PFC are very large, especially at low line AC input, creating heat and resulting in high temperature and poor efficiency. Another drawback is that it is difficult to support a wider range of output voltages Vo using an LLC converter.

Figure 5:
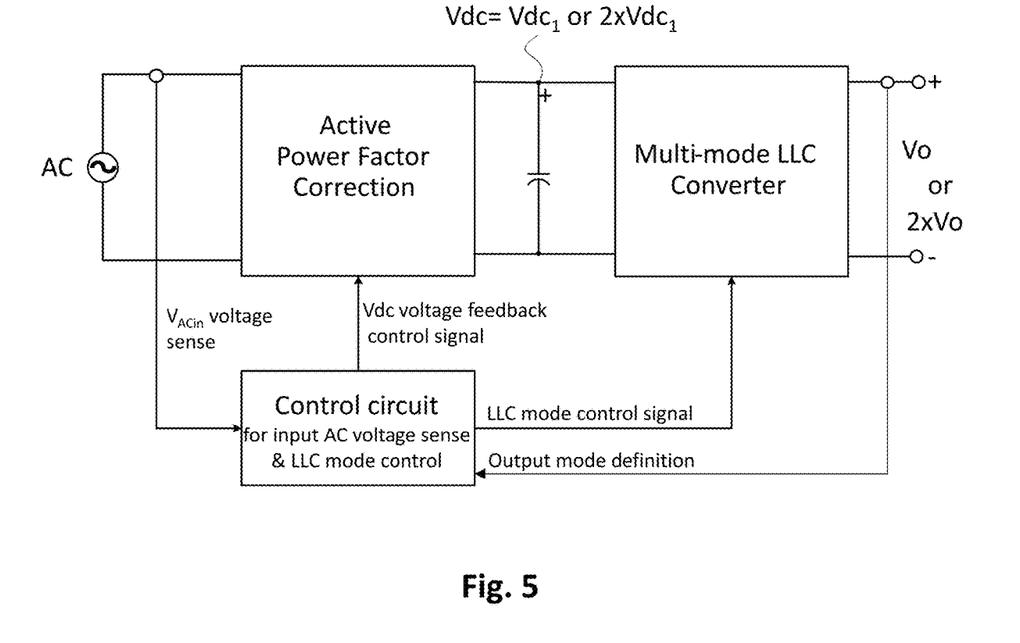
FIG. 5 shows a functional block diagram for AC input AC/DC SMPS of example embodiments comprising an active PFC stage, a DC/DC converter stage comprising a multi-mode LLC topology, and a control circuit providing voltage feedback and LLC mode control signals.

A simplified circuit block diagram for an example AC input AC/DC Switching Mode Power Supply (SMPS) for example embodiments comprising a PFC stage, a multi-mode LLC resonant DC/DC converter stage, and a control circuit for input AC voltage sense and LLC mode control shown in FIG. 5. (For brevity, the multi-mode LLC resonant DC/DC converter may be referred to simply as the "multi-mode LLC converter"" or "LLC converter"). The PFC stage may be any suitable active PFC topology, e.g., a bridge diode boost PFC topology or a BTP PFC topology, which can provide a dc bus voltage Vdc of a first value $Vdc_1$, e.g. 200 Vdc for low line AC input and a second value $Vdc_2=2\times V_{dc1}$, e.g. 400V for high line AC input. The control circuit is configured to sense the input AC voltage, e.g. sense the peak AC input voltage, and provide a Vdc voltage feedback control signal to the PFC controller to control the dc bus voltage Vdc dependent on the peak input AC voltage. The multi-mode LLC converter is an LLC converter that can be operated in a plurality of modes, e.g. a half-bridge mode and a full-bridge mode, dependent on the sensed AC line input. The control circuit is configured to provide an LLC mode control signal to the LLC controller to operate in one of the plurality of modes, dependent on the sensed AC line input. The multi-mode LLC converter can also operate in first and second output modes, to provide an output voltage Vo of a first value $Vo_1$ or a second value $Vo_2$, where $Vo_2=2\times Vo_1$.

Figure 6A:
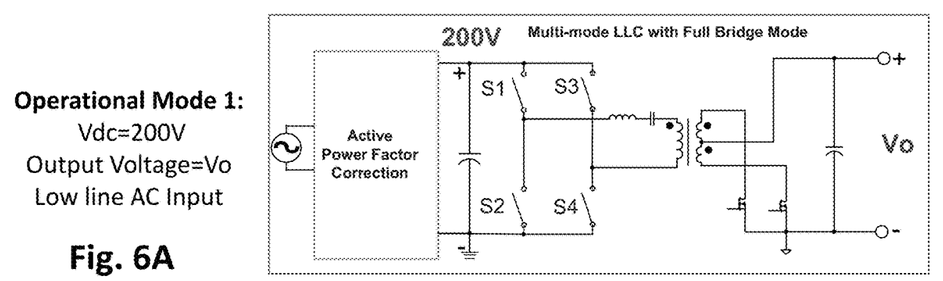
FIGS. 6A, 6B and 6C show circuit schematics to illustrate, respectively, operational modes 1, 2 and 3 of an example SMPS comprising a multi-mode LLC converter with voltage feedback and LLC mode control.
Figure 6B:
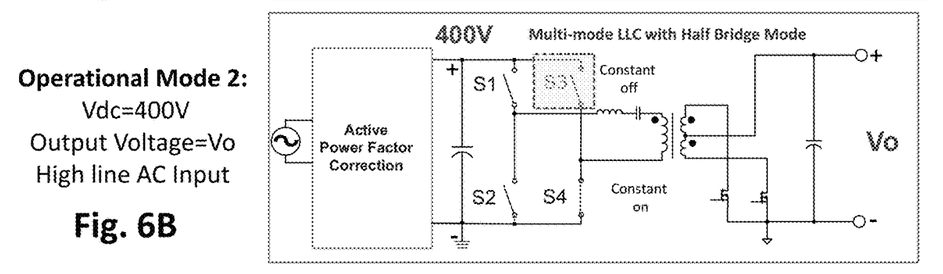
Figure 6C:
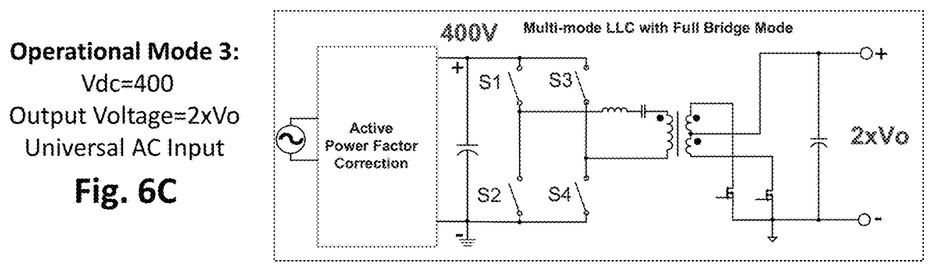

FIGS. 6A, 6B and 6C show circuit schematics to illustrate, respectively, operational modes 1, 2 and 3 of a SMPS comprising an active power factor correction stage and a multi-mode LLC stage which is operable in full-bridge and half-bridge modes. The active PFC stage may have any suitable topology which can provide control of the dc bus voltage Vdc to provide first and second bus voltages $Vdc_1$ and $2\times Vdc_1$, which in this example are 200V and 400V, respectively. In the first operational mode, FIG. 6A, for low line AC input, the control circuit senses the peak AC input voltage and outputs a first (voltage feedback) control signal to the PFC, to operate the PFC to set Vdc at $Vdc_1$=200V, and outputs a second (FB/HB mode) control signal to the LLC controller to operate the LLC in full-bridge mode and to provide a first output voltage Vo. In the second operational mode, FIG. 6B, for high line AC input, the control circuit senses the peak AC input voltage and outputs a first (voltage feedback) control signal to the PFC, to operate the PFC to set Vdc as $2\times Vdc_1$=400V, and outputs a second (FB/HB mode) control signal to the LLC controller to operate the LLC in half-bridge mode, and to provide a first output voltage Vo. The control circuit may also be configured to receive an output mode definition, which defines first and second output voltages, and provide first and second control signals for a third operational mode. In the third operational mode, FIG. 6C, for Universal AC input, the control circuit outputs a first (voltage feedback) control signal to the PFC controller to select Vdc to $2\times Vdc_1$=400V, and outputs a second (FB/HB mode) control signal to the LLC controller so that the LLC converter operates in full-bridge mode and provides a second output voltage $2\times Vo$, which is twice the first output voltage.

Figure 7:
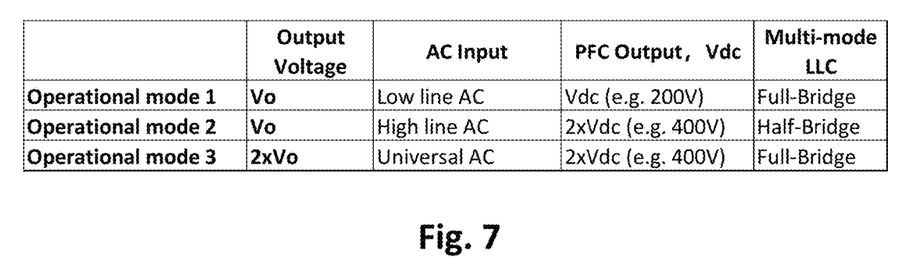
FIG. 7 is a table comparing parameters for operation in modes 1, 2 and 3.

A table comparing parameters for operation in modes 1, 2 and 3 is shown in FIG. 7.

Example I: SMPS for 1 kW Datacenter PSU

Figure 8:
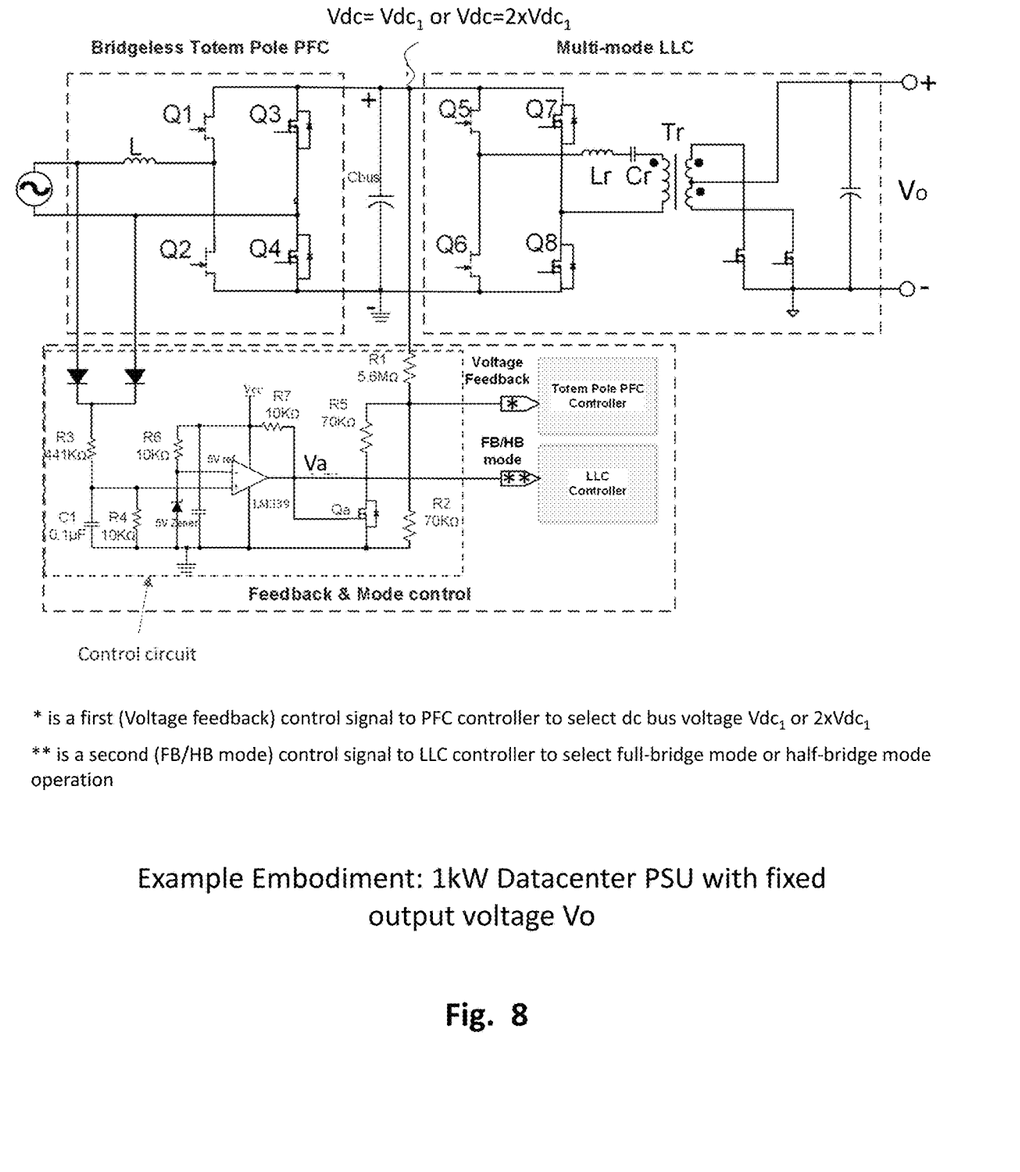
FIG. 8 shows a circuit schematic for an AC input AC/DC SMPS of an example embodiment for a 1 kW fixed output voltage Vo datacenter PSU comprising a BTP PFC stage, a multi-mode full-bridge SR LLC DC/DC converter and a control circuit for providing control signals for voltage feedback and multi-mode LLC operation.

A circuit schematic for an example implementation of an SMPS of an embodiment configured for 1 kW datacenter PSU, with fixed output voltage Vo, is shown in FIG. 8. The SMPS comprises a Bridgeless Totem Pole (BTP) PFC, a multi-mode LLC converter which is operable in full-bridge and half-bridge modes, and a control circuit for voltage feedback and LLC mode control.

Operation of Control Circuit for Voltage Feedback & Mode control: Resistor R3, capacitor C1 and resistor R4 form a voltage divider to sense peak AC input voltage and compare it with a 5V reference voltage using differential comparator. The comparator output voltage Va controls a voltage feedback control signal * to the BTP PFC controller and a mode control signal ** to the LLC controller to select full-bridge (FB) mode or half-bridge (HB) mode operation of the LLC converter.

At low line AC input, the comparator output voltage Va is "low", and transistor Qa is in the off-state. The resistors R1 and R2 form a voltage divider to provide a first (voltage feedback) control signal to PFC controller, which regulates Vdc to $Vdc_1$=200V. The comparator output voltage Va being "low" also provides a second (FB/HB mode) control signal to the LLC controller, which makes the LLC converter operate in full-bridge mode.

At high line AC input, the comparator output voltage Va is "high", and transistor Qa is in the on-state. The resistor R1 and resistors R2 and R5 form a voltage divider to provide a voltage feedback control signal to the PFC controller, which regulates Vdc to $2\times Vdc_1$=400V. The voltage Va being "high" also provides a FB/HB mode control signal to the LLC controller, which makes the LLC converter operate in half-bridge mode.

By way of example only, the PSU of the embodiment shown in FIG. 8 is a GaN/Silicon hybrid implementation. The switches Q1 and Q2 of the BTP PFC comprise GaN transistors and the switches Q3 and Q4 of the BTP PFC comprises Si MOSFETs. The multi-mode LLC converter is a full-bridge SR LLC converter wherein the first half-bridge leg comprises switches Q5 and Q6, which comprise GaN transistors, and the second half-bridge leg comprises switches Q7 and Q8, which comprise Si MOSFETs. Using GaN transistors, instead of silicon power transistors provides several advantages. Compared to silicon MOSFETs, GaN transistors have lower on-resistance, higher breakdown voltage, no reverse-recovery characteristics. GaN devices have much lower switching losses, so they can operate at higher switching frequencies. For example, in a PSU or Universal AC/DC adapter, which uses GaN devices, higher switching frequencies allow for the use of smaller capacitors and inductors, which can significantly reduce the power converter size, weight and cost.

A GaN/Si hybrid implementation may be used to take advantage of different characteristics of both GaN transistors and Si transistors, e.g. to optimize performance and cost. The switches of multi-mode LLC may be implemented with other combinations of power semiconductor technologies. For example, both half-bridge legs comprise GaN transistors, or both half-bridge legs comprise SiC transistors, or both half-bridge legs comprise Si transistors. In another example, the first half-bridge leg comprises wide-bandgap transistors, e.g. SiC transistors and the second half-bridge leg comprises Si transistors.

Figure 9A:
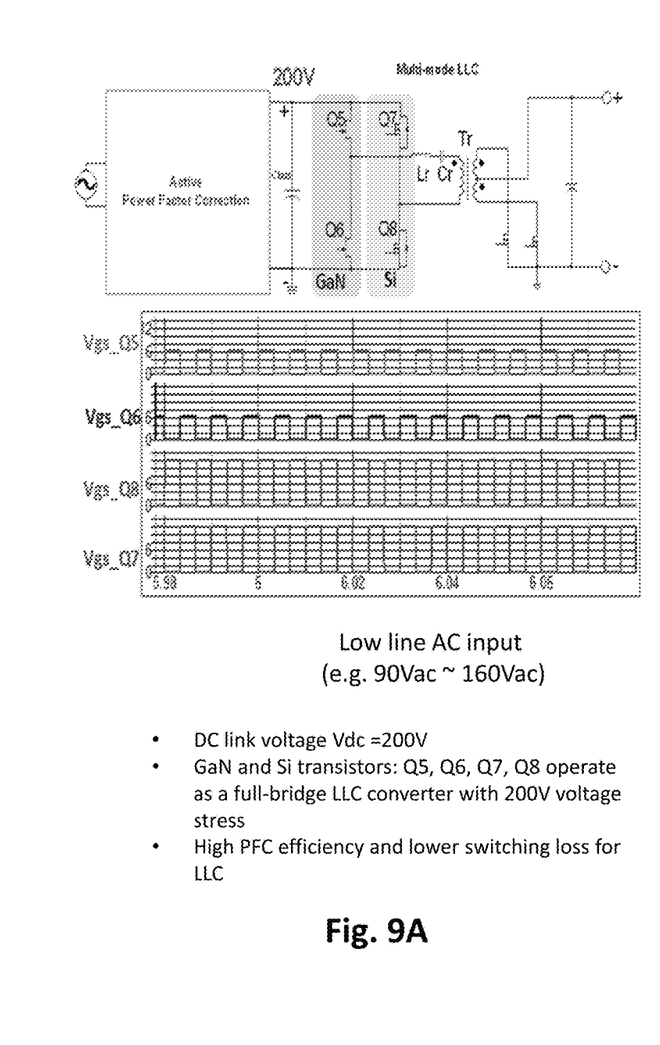
FIG. 9A shows a circuit schematic and gate-source voltage (Vgs) waveforms for each transistor switch of the LLC converter, configured for operation in mode 1, for low line AC input.
Figure 9B:
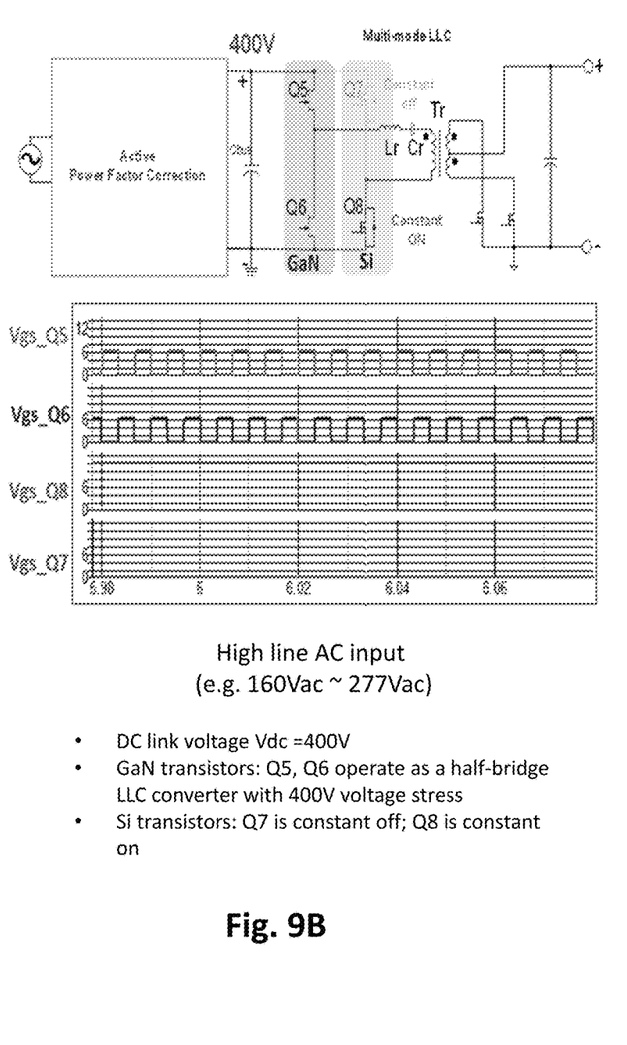
FIG. 9B shows a circuit schematic and gate-source voltage (Vgs) waveforms for each transistor switch of the LLC converter, configured for operation in mode 2, for high line AC input.

FIG. 9A shows a circuit schematic and gate-source voltage (Vgs) waveforms for each transistor switch of the LLC converter, configured for operation in mode 1, for low line AC input, e.g. 90 Vac to 160 Vac, with a DC link voltage Vdc=200V. In this mode the switches Q5 and Q6 (GaN transistors) and switches Q7 and Q8 (Si transistors) operate in a full-bridge mode with 200V voltage stress. This mode enables the PFC to operate with higher efficiency, and the LLC converter operates with lower switching losses. FIG. 9B shows a circuit schematic and gate-source voltage (Vgs) waveforms for each transistor switch of the LLC converter, configured for operation in mode 2, for high line AC input, e.g. 160 Vac to 277 Vac with a DC link voltage Vdc=400V. Switches Q5 and Q6 (GaN transistors) operate with 400V voltage stress. For switches Q7 and Q8 (silicon transistors), Q7 is constantly off and Q8 is constantly on, so the LLC converter operates in a half-bridge mode.

Figure 10:
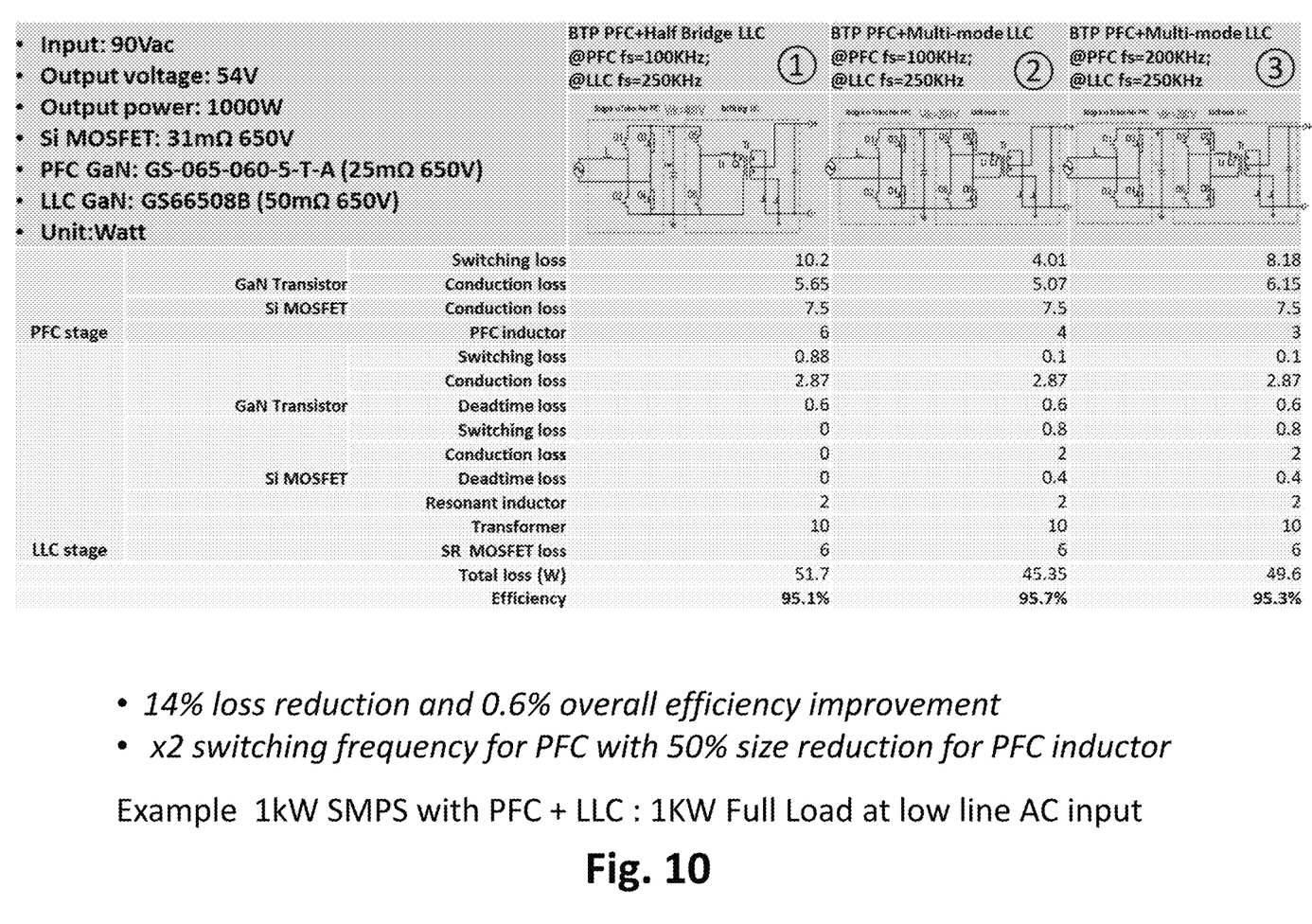
FIG. 10 shows a table of simulated data for a 1 kW datacenter PSU of an example embodiment comprising a SMPS with a BTP PFC and multi-mode LLC converter for full load at low line AC input.
Figure 11:
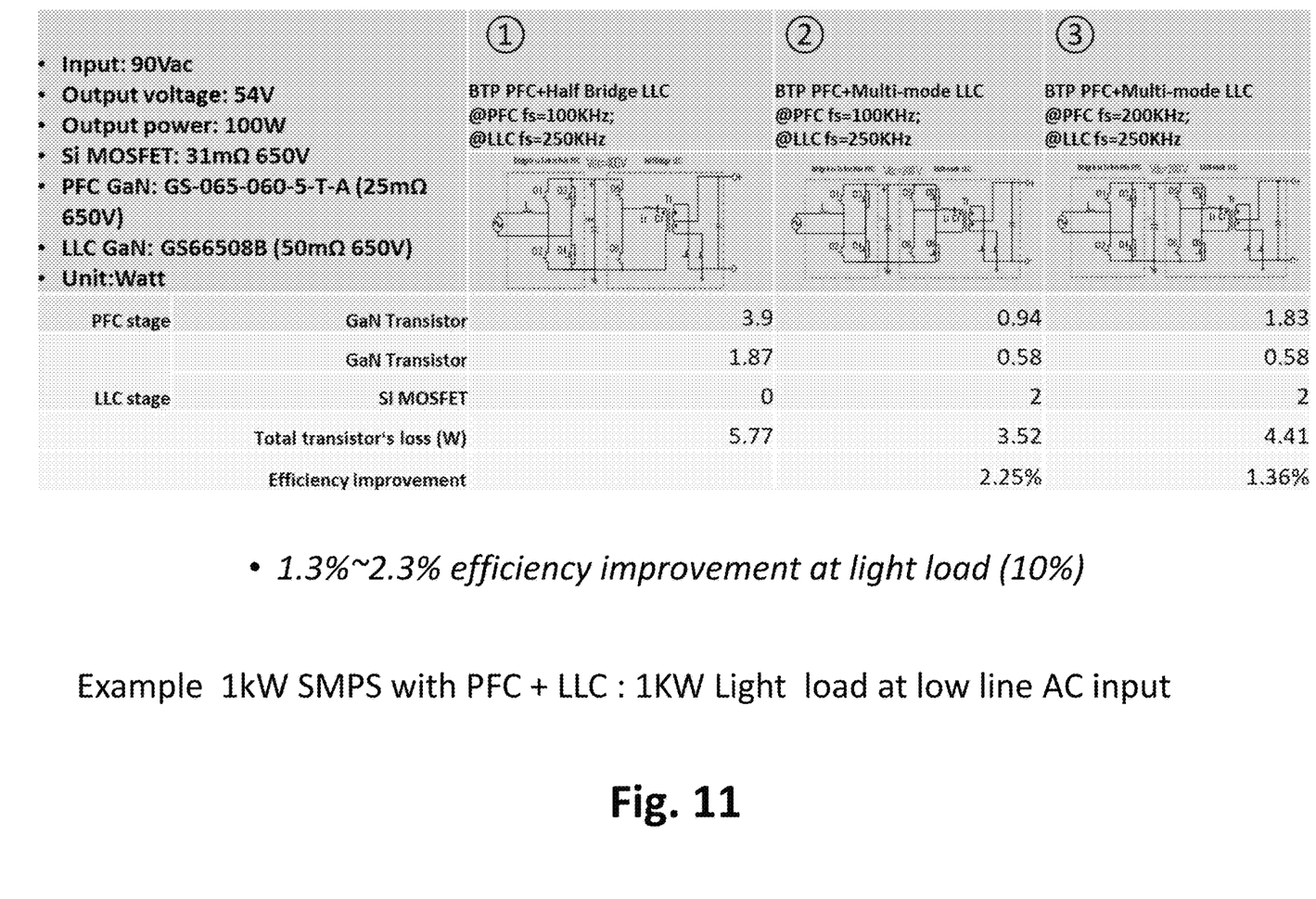
FIG. 11 shows a table of simulated data for the 1 kW datacenter PSU of the example embodiment comprising a SMPS with BTP PFC and multi-mode LLC converter for light load (10% load) at low line AC input.

FIG. 10 shows a table of simulated data for an example 1 kW datacenter PSU of an embodiment 1 comprising a SMPS with a BTP PFC and half-bridge LLC converter, and corresponding data for a SMPS of embodiments 2 and 3 comprising a BTP PFC and a multi-mode LLC converter for two different switching frequencies (fs=100 kHz and 200 kHz) for the PFC, for full load, at low line AC input. FIG. 11 shows corresponding data for light load (10%), at low line AC input. In SMPS for PSU of these example embodiments, for low line AC input, efficiency is improved by 0.6% for full load and by 1.3% to 2.3% for light load. The PSU can support full rated power for universal AC input, for both low line AC input and high line AC input.

Figure 12:
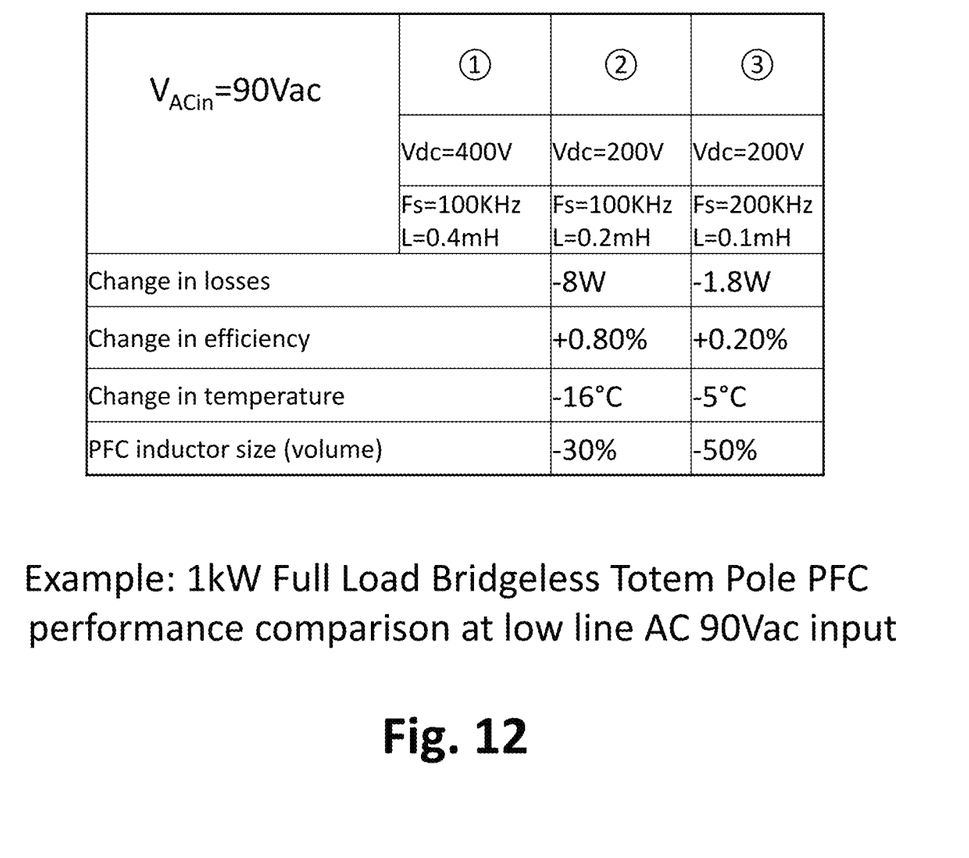
FIG. 12 shows a table of data comparing performance of the example BTP PFC for different operational modes, for low line AC input and for 1 kW full load.

Comparative performance data for the BTP PFC, for full-load, low line AC input, are summarized in the table in FIG. 12. By using a PFC switching frequency of 200 kHz instead of 100 kHz, the size (volume) of the PFC inductor can be reduced by 50%. A smaller size inductor provides for a SMPS with a higher power density. The design provides the same ripple current on the PFC inductor, with different inductance values. The losses are transistor losses only, and do not include the PFC inductor losses. Data is simulated for an ambient temperature of 40 C, a thermal resistance (Rth) of the case to heatsink of 2.5K/W and a Rth of the heatsink to ambient of 0.5K/W.

Example II: SMPS for a USB PD 3.1 Adapter

The USB Power Delivery Specification Revision 3.1 (PD3.1) May 2021 defines a choice of three new fixed higher voltages: 28V (above 100 W), 36V (above 140 W) and 48V (above 180 W) compared to previous PD3.0. The previously defined standard power range (SPR) comprised fixed voltages of 5V, 9V, 15V and 20V. A new adjustable voltage supply (AVS) mode provides for a range from 15V to one of three maximum voltages (28V, 36V, or 48V) depending on the available power.

Figure 13:
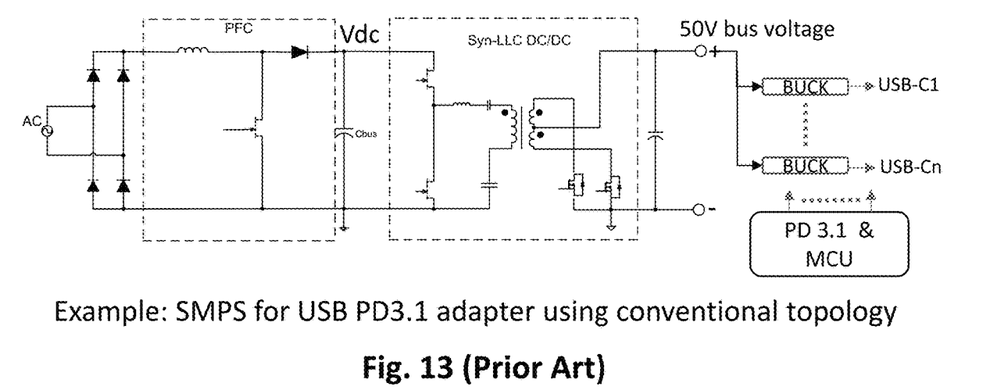
FIG. 13 (Prior Art) shows a circuit schematic for an example SMPS for a USB PD 3.1 adapter using a conventional topology.

A circuit schematic for an example SMPS for a USB PD 3.1 adapter using a conventional topology comprising a PFC stage, a synchronous-LLC DC/DC converter stage, which provides an output bus voltage of 50V to buck converters for each USB-C output port is shown in FIG. 13. The efficiency of the PFC stage is low when the dc bus voltage Vdc is fixed at 400 Vdc and the AC line input is low, e.g. in the range of 90 Vac to 120 Vac. The efficiency of a buck DC/DC converter supplied by a 50V bus voltage input to provide outputs to the USB ports of 5V, 9V and 15V is very low.

Figure 14:
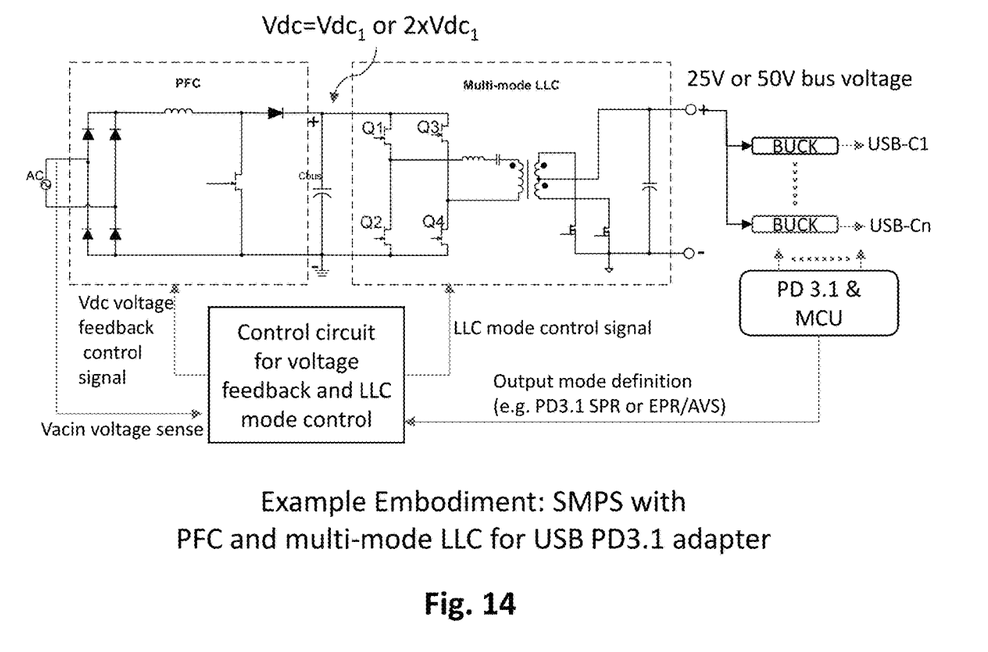
FIG. 14 shows a circuit schematic for an example SMPS for a USB PD 3.1 adapter of an example embodiment comprising a rectifier PFC, a multi-mode SR LLC converter and a control circuit for multi-mode operation, dependent on AC input voltage and defined PD3.1 protocol output voltage.

A circuit schematic for an example SMPS for a USB PD 3.1 adapter of an example embodiment comprising a PFC, a multimode LLC DC/DC converter and a control circuit for voltage feedback and multi-mode LLC operation, dependent on AC line input voltage, is shown in FIG. 14. The PFC stage can use any active PFC topology, such as a bridge rectifier boost PFC or bridgeless totem pole PFC. In FIG. 14, a bridge rectifier boost PFC is illustrated by way of example. The isolated DC/DC stage comprises a multi-mode LLC which can be configured to operate in full-bridge mode or half-bridge mode. As described above, with reference to the control circuit of the embodiment shown in FIG. 8, the control circuit senses the peak AC input voltage and provides a first (voltage feedback) control signal to the PFC controller to operate the PFC to provide a first DC bus voltage Vdc=$Vdc_1$, e.g. 200V, for low line AC input, and to provide a second DC bus voltage Vdc=$2 \times Vdc_1$, e.g. 400V, for high line AC input. The control circuit also provides a second (FB/HB mode) control signal to the LLC controller, to enable the LLC to operate in full-bridge mode or in half-bridge mode, dependent on the sensed AC line input and defined PD3.1 protocol output voltage. The control circuit also receives an output mode control signal from the controller of the buck DC/DC converters (labelled PD3.1& MCU) which defines the required output mode, e.g. PD3.1 SPR, or EPR/AVS, to control the output voltage.

Figure 15A:
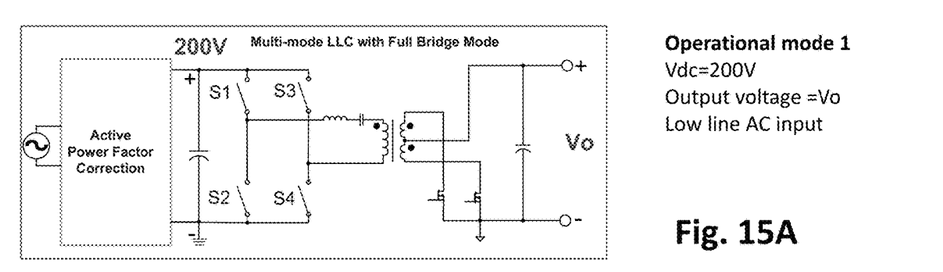
FIGS. 15A, 15B, 15C show circuit schematics to illustrate, respectively, operational modes 1, 2 and 3 of the example SMPS illustrated in FIG. 14.
Figure 15B:
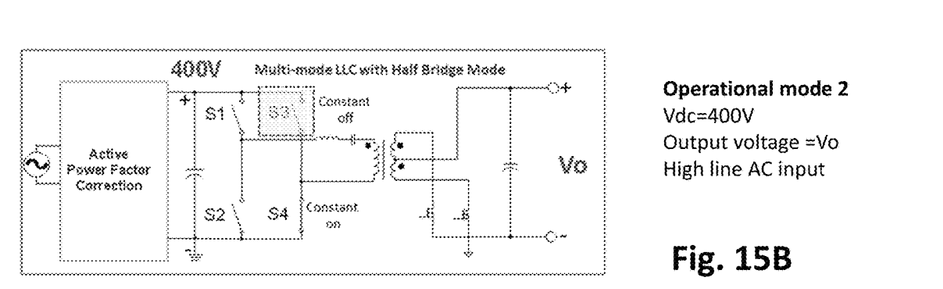
Figure 15C:
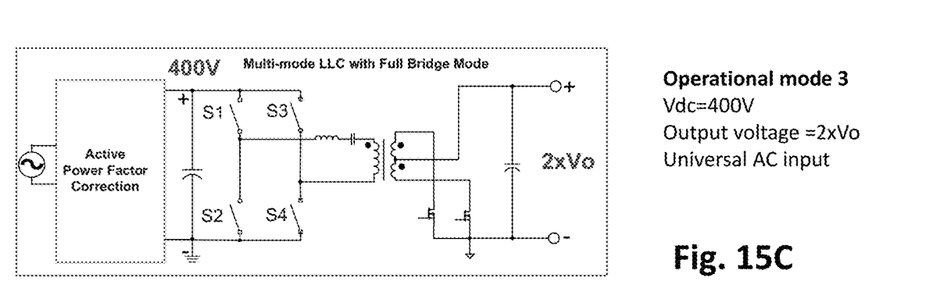
Figure 16:
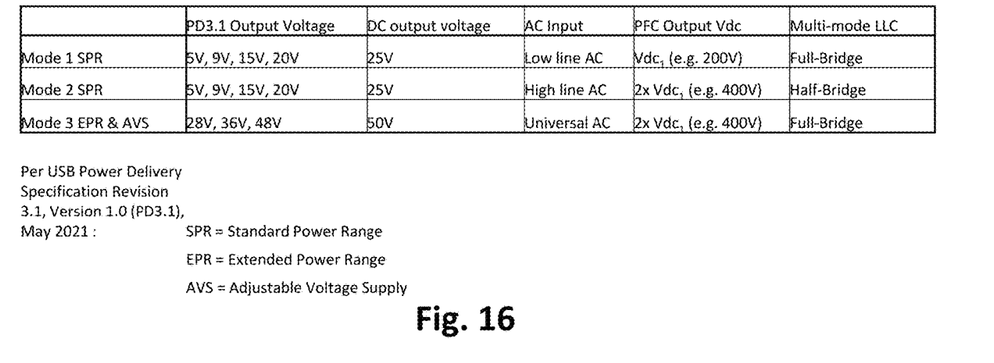
FIG. 16 shows a table comparing parameters for operation in modes 1, 2 and 3 of an example SMPS with PFC and multi-mode LLC for a USB PD3.1 adapter.

FIGS. 15A, 15B and 15C show circuit schematics to illustrate, respectively, operational modes 1, 2 and 3. In the first operational mode, FIG. 15A, for low line AC input the control circuit outputs a first (voltage feedback) control signal to the PFC controller to operate the PFC stage to provide a first DC bus voltage $Vdc_1$, e.g. 200V and outputs a second (FB/HB mode) control signal to the LLC controller to operate the multi-mode LLC in full-bridge mode, to provide a first DC output voltage Vo. In the second operational mode, FIG. 15B, for high line AC input, the control circuit sends a first control signal to the PFC controller to operate the PFC stage to provide a second DC bus voltage $2 \times Vdc_1$, e.g. 400V, and sends a second control signal to the LLC controller to operate the multi-mode LLC in half-bridge mode to provide the DC output voltage Vo. In the third operational mode, FIG. 15C, for universal AC input, the control circuit provides control signals to operate the PFC to provide the second DC bus voltage $2 \times Vdc_1$, e.g. 400V and to operate the multi-mode LLC in half-bridge mode to provide a DC output voltage $2 \times Vo$.

FIG. 18 shows a table comparing parameters for operation in modes 1, 2 and 3 for providing example power outputs for PD3.1. Mode 1 and mode 2 support PD3.1 SPR mode with PD output voltage 5V, 9V, 15V and 20V. The DC bus voltage is set at 25V as an input to the buck DC/DC stage to increase the efficiency of buck DC/DC stage compared to a conventional fixed 50V bus voltage. Mode 1 is used for low line AC input voltage, and the PFC output voltage is set at Vdc (e.g. 200V) to increase PFC efficiency at low line AC input and the multi-mode LLC converter operates in full-bridge mode. Mode 2 is used for high line AC input voltage, and the PFC output voltage is set at $2 \times Vdc$ (e.g. 400V) and the multi-mode LLC converter operates in half-bridge mode. Mode 3 supports PD3.1 EPR or AVS mode with PD output voltages at 28V, 36V and 48V. The DC bus voltage supplied by the multi-mode LLC is set at 50V as an input voltage of buck DC/DC stage. The PFC output voltage is set at $2 \times Vdc$ (e.g. 400V) and the multi-mode LLC converter operates in full-bridge mode when the AC line input voltage is a universal input for both low line and high line AC input.

For example, when the SMPS PD output voltage is SPR output (e.g. 5V, 9V, 15V and 20V), the DC bus voltage is set at 25V and multi-mode LLC converter operates in mode 1 (full-bridge) or mode 2 (half-bridge), according to the AC input voltage. When the PD output voltage is EPR or AVS (e.g. 28V, 36V and 48V), the DC bus voltage is set at 50V and multi-mode LLC converter operates in at full-bridge mode at universal AC input voltage. By changing the DC bus voltage according to PD output voltage, the buck DC/DC converter efficiency is dramatically increased because of a smaller difference between DC bus voltage and output voltage. The multi-mode LLC converter enables support for wider range of voltage outputs, such as to meet PD3.1 requirements for an output voltage range from 5V to 48V.

Although some SMPS of example embodiments have been described in detail, these are provided by way of example only. DC bus voltages and DC output voltages may be selected to meet requirements for different target applications. It will be appreciated that target applications may include, for example: higher power adapters which require PFC, e.g. ≥75 W and future PD3.1 adapters; datacenter or server PSU, PSU for telecom and industrial applications, LED lighting drivers, and other AC/DC SMPS applications.

Although embodiments of the invention have been described and illustrated in detail, it is to be clearly understood that the same is by way of illustration and example only and not to be taken by way of limitation, the scope of the present invention being limited only by the appended claims.

The invention claimed is:
1. An AC input AC/DC Switching Mode Power Supply (SMPS) comprising:
  a first stage comprising a non-isolated AC/DC converter comprising a power factor correction (PFC) stage which receives an AC input voltage and provides a DC bus voltage; and a PFC controller;

a second stage comprising an isolated DC/DC converter comprising an LLC resonant DC/DC converter which receives the DC bus voltage and provides an output voltage; and an LLC controller;

the LLC resonant DC/DC converter comprising first and second half-bridge legs, which are operable in a half-bridge mode and in a full-bridge mode; and a control circuit configured to:
 sense the AC input voltage,
 provide a first control signal, comprising a voltage feedback control signal, to the PFC controller to regulate an output of the PFC to provide the DC bus voltage, dependent on the AC input voltage;
 provide a second control signal, comprising one of a full-bridge mode signal and a half-bridge mode control signal, to the LLC controller to operate the LLC resonant DC/DC converter in the full-bridge mode or the half-bridge mode, dependent on the AC input voltage;
in a first operating mode, for a low line AC input at or below a threshold value, the PFC stage regulates the DC bus voltage to a first value and LLC resonant DC/DC converter operates in the full-bridge mode to provide a first output voltage; and
in a second operating mode, for a high line AC input above the threshold value, the PFC stage regulates the DC bus voltage to a second value, which is twice the first value, and the LLC resonant DC/DC converter operates in the half-bridge mode to provide the first output voltage.

2. The AC/DC SMPS of claim 1, wherein:
in a third operating mode, for universal AC input, the PFC stage regulates the DC bus voltage to the second value and the LLC resonant DC/DC converter operates in the full-bridge mode to provide a second output voltage which is twice the first output voltage.

3. The AC/DC SMPS of claim 1, which is configured as a Power Supply Unit which is operable in said first and second operating modes to provide the first output voltage having a fixed value.

4. The AC/DC SMPS of claim 2, configured as power delivery (PD) adapter comprising a plurality of output ports, each output port comprising a buck converter; and an output port controller,
 wherein each buck converter receives the first output voltage or the second output voltage from the LLC resonant DC/DC converter, and provides an output voltage to a corresponding output port,
 wherein the output port controller provides an output mode definition signal to the control circuit to control the output voltage:
 in the first and second operating modes, each buck converter receives the first output voltage and the output voltage of the output ports is selected from a first group of output voltages for a first power range;
 in the third operating mode, each buck converter receives the second output voltage and the output voltage of the output ports is selected from a second group of output voltages for a second power range, the second power range being higher than the first power range.

5. The AC/DC SMPS of claim 2, configured as USB power delivery adapter comprising a plurality of output ports, each output port comprising a buck converter and a USB port; and an output port controller;
 wherein each buck converter receives the first output voltage or the second output voltage from the LLC resonant DC/DC converter, and provides an output voltage to a corresponding USB port,
 wherein the output port controller provides an output mode definition signal to the control circuit to control the output voltage, so that:
 in the first and second operating modes, each buck converter receives the first output voltage and the output voltage is selected from a Standard Power Range (SPR) consisting of output voltages of 5V, 9V, 15V and 20V;
 in the third operating mode, each buck converter receives the second output voltage and the output voltage of the output ports is selected from an Extended Power Range (EPR) or Adjustable Voltage Supply (AVS) consisting of output voltages of 28V, 36V and 48V;
 wherein the SPR, EPR and AVS are compliant with USB Power Delivery Specification Revision 3.1.

6. The AC/DC SMPS of claim 5, wherein the first output voltage is 25V and the second output voltage is 50V.

7. The AC/DC SMPS of claim 1, wherein the non-isolated AC/DC converter comprising the PFC stage comprises a bridge rectifier PFC or a bridgeless totem pole PFC.

8. The AC/DC SMPS of claim 1, wherein switches of the first and second half-bridge legs of the LLC resonant DC/DC converter comprise any one of: GaN transistors; SiC transistors; and Si transistors.

9. The AC/DC SMPS of claim 1, wherein switches of the first half-bridge leg comprise GaN transistors and switches of the second half-bridge leg comprise Si transistors.

10. The AC/DC SMPS of claim 1, wherein switches of the first half-bridge leg comprise SiC transistors and switches of the second half-bridge leg comprise Si transistors.

11. A method of operating an AC input AC/DC Switching Mode Power Supply (SMPS)
 the AC/DC SMPS comprising:
 a first stage comprising a non-isolated AC/DC converter comprising a power factor correction (PFC) stage which receives an AC input voltage and provides a DC bus voltage; and a PFC controller;
 a second stage comprising an isolated DC/DC converter comprising an LLC resonant DC/DC converter which receives the DC bus voltage and provides an output voltage, and an LLC controller;
 the LLC resonant DC/DC converter comprising first and second half-bridge legs, which are operable in a half-bridge mode and in a full-bridge mode; and
 a control circuit;
 the method comprising, in the control circuit,
 sensing the AC input voltage,
 providing a first control signal, comprising a voltage feedback signal, to the PFC controller to regulate the output voltage of the PFC to provide a DC bus voltage, dependent on the AC input voltage;
 providing a second control signal, comprising one of a full-bride mode control signal and a half-bridge mode control signal, to the LLC controller to operate the LLC resonant DC/DC converter in the full-bridge mode or the half-bridge mode, dependent on the AC input voltage; and
 in a first operating mode, for a low line AC input at or below a threshold value, controlling the PFC stage to regulates the DC bus voltage to a first value and controlling the LLC resonant DC/DC converter to operate in full-bridge mode to provide a first output voltage;

and in a second operating mode, for a high line AC input above the threshold value, controlling the PFC stage to regulate the DC bus voltage to a second value, which is twice the first value, and controlling the LLC resonant DC/DC converter to operate in the half-bridge mode to provide the first output voltage.

12. The method of claim 11, comprising: in a third operating mode, for universal AC input, controlling the PFC to regulate the DC bus voltage to the second value and controlling the LLC resonant DC/DC converter to operate in the full-bridge mode to provide a second output voltage, which is twice the first output voltage.

13. The method of claim 12, comprising receiving from an output port controller an output mode definition signal to enable the control circuit to select one of said first, second and third operating modes to provide an appropriate one of the first output voltage and the second output voltage.

14. A control circuit for an AC input AC/DC Switching Mode Power Supply (SMPS), the AC/DC SMPS comprising:
a first stage comprising a non-isolated AC/DC converter comprising a power factor correction (PFC) stage which receives an AC input voltage and provides a DC bus voltage, and a PFC controller;
a second stage comprising an isolated DC/DC converter comprising an LLC resonant DC/DC converter which receives the DC bus voltage and provides an output voltage; and an LLC controller;
the LLC resonant DC/DC converter comprising first and second half-bridge legs, which are operable in an half-bridge mode and in a full-bridge mode;
the control circuit being configured for implementing a method comprising:
sensing the AC input voltage,
providing a first control signal, comprising a voltage feedback control signal, to the PFC controller to regulate the output voltage of the PFC to provide the DC bus voltage, dependent on the Ac input voltage;
providing a second control signal, comprising one of a full bridge mode and a half-bridge mode control signal, to the LLC controller to operate the LLC resonant DC/DC converter in the full-bridge mode or the half-bridge mode, dependent on the AC input voltage;
in a first operating mode, for a low line AC input at or below a threshold value, controlling the PFC to regulates the DC bus voltage to a first value and controlling the LLC resonant DC/DC converter to operate in a full-bridge mode to provide a first output voltage;
and
in a second operating mode, for a high line Ac input above the threshold value, controlling the PFC to regulates the DC bus voltage to a second value, which is twice the first value, and controlling the LLC resonant DC/DC converter to operate in the half-bridge mode to provide the first output voltage.

15. The control circuit of claim 14 comprising:
an input for receiving the AC input voltage and means for generating an input voltage sense signal indicative of any one of a low line AC input, a high line AC input and a Universal AC input;
an input for receiving an output voltage mode definition signal to define a specified output voltage value;
means for comparing the input voltage sense signal with a reference voltage and generating the first control signal and the second control signal, dependent on the AC input voltage and the specified output voltage value;
the first control signal being output to the PFC controller to regulate the PFC to provide an output Vdc having the first value or the second value;
the second control signal being a output to the LLC controller to select the half-bridge mode or the full-bridge mode of the LLC resonant DC/DC converter and to regulate an output voltage of the LLC resonant DC/DC converter to a first value (Vo) or a second value (2×Vo).

* * * * *